D. STUART.

Cooking Stove and Range.

No. 38,426.

2 Sheets—Sheet 1.

Patented May 5, 1863.

Witnesses:

Inventor:

D. STUART.
Cooking Stove and Range.
No. 38,426.
2 Sheets—Sheet 2.
Patented May 5, 1863.
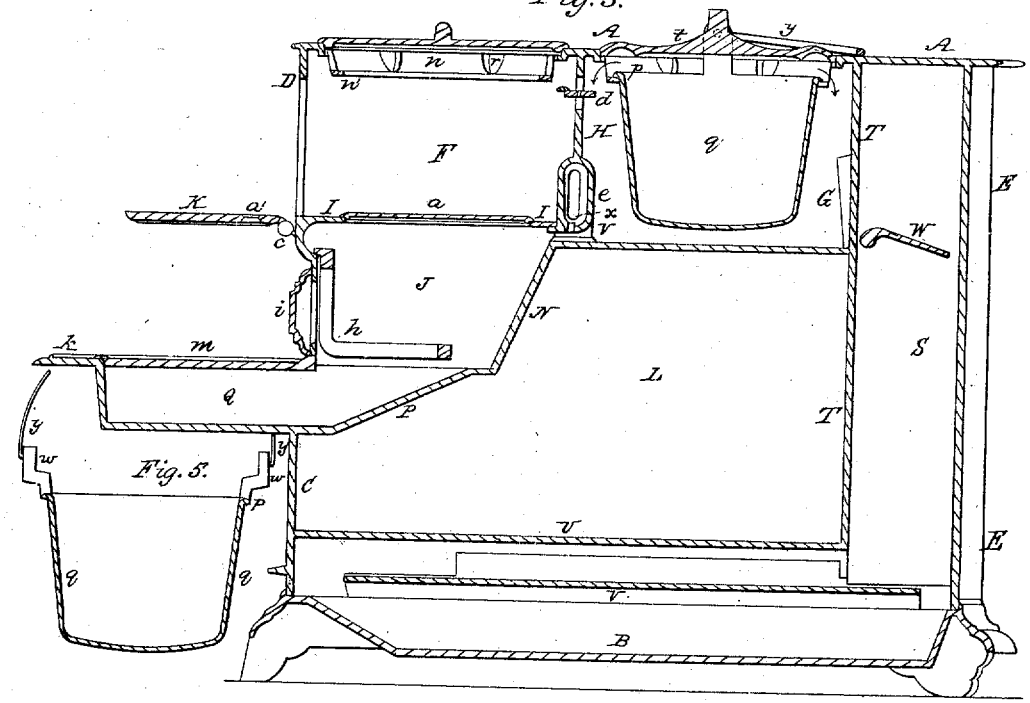
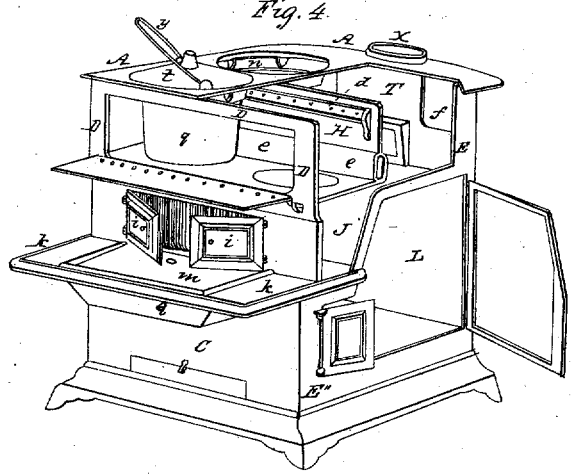
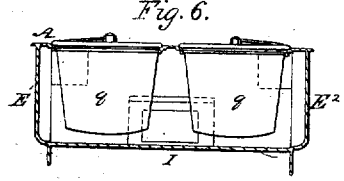
Witnesses:
Charles E. Foster
Charles Howson
Inventor:
Henry Howson
Atty for David Stuart

UNITED STATES PATENT OFFICE.

DAVID STUART, OF PHILADELPHIA, PENNSYLVANIA.

IMPROVEMENT IN COOKING STOVES AND RANGES.

Specification forming part of Letters Patent No. 38,426, dated May 5, 1863.

*To all whom it may concern:*

Be it known that I, DAVID STUART, of Philadelphia, Pennsylvania, have invented certain Improvements in Cooking Stoves and Ranges, and Culinary Vessels for the Same; and I do hereby declare the following to be a full, clear, and exact description of the same, reference being had to the accompanying drawings, and to the letters of reference marked thereon.

My improvements in cooking stoves and ranges, and culinary vessels for the same, (fully described hereinafter,) have been made with the view of obtaining the following advantageous results: First, the effectual disposal of the steam, fumes, &c., which are generated in preparing articles of diet, and which are given out from ordinary stoves and ranges, so as to pervade the kitchen and adjacent rooms, to the annoyance of the inmates; second, the rapid heating of the boilers used in connection with the stove or range; third, increased facilities for roasting, broiling, &c.; fourth, the rapid heating of the oven, and the maintenance of the same at a uniform temperature; fifth, the economizing of fuel; and, sixth, an increased heat derived from the exterior of the stove or range.

In order to enable others familiar with stoves and ranges to make and use my invention, I will now proceed to describe its construction and operation.

Figure 2:
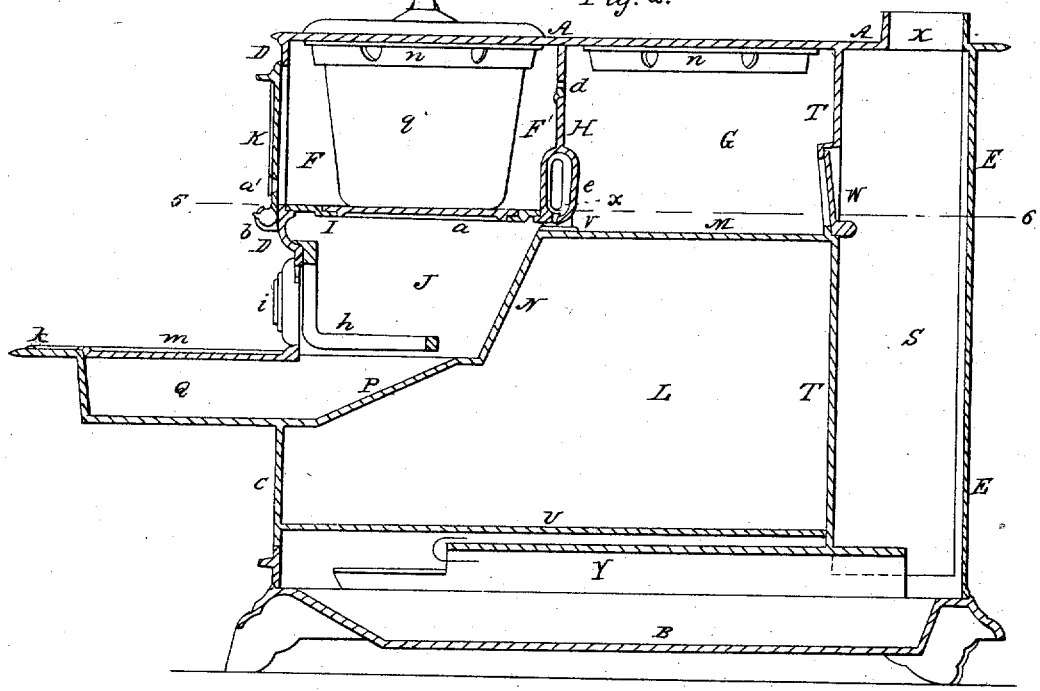
Figure 1:
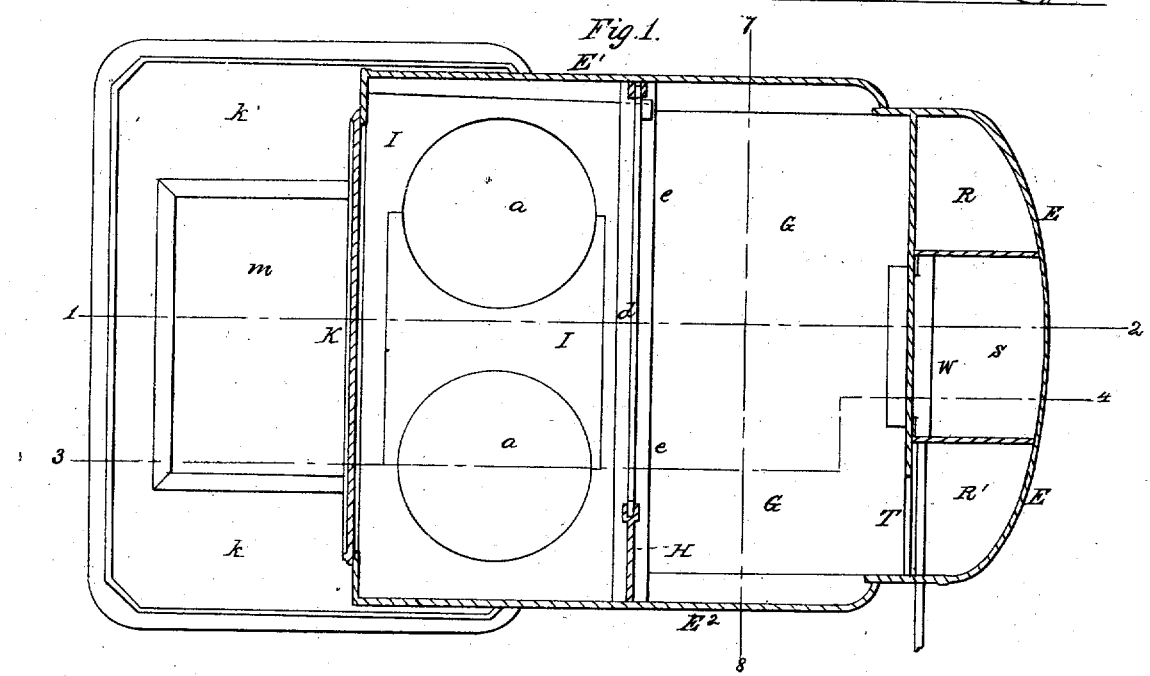

On reference to the accompanying drawings, which form a part of this specification, Figure 1 is a plan view of a cooking-stove with my improvements, the upper plates of the stove being removed. Fig. 2 is a vertical section on the line 1 2, Fig. 1; Fig. 3, a vertical section on the line 3 4, Fig. 1; Fig. 4, a perspective view, with a portion of the upper plate and one of the side plates removed; Fig. 5, a sectional view of one of the culinary boilers to be used in connection with my improvements; Fig. 6, a diagram drawn to a reduced scale, and illustrating a transverse section of the upper portion of the stove on the line 7 8, Fig. 1.

Similar letters refer to similar parts throughout the several views.

A represents the top plate, B the bottom plate, C the lower front plate, D the upper front plate, E the rear plate, and E' and E², Fig. 1, the opposite side plates, of the stove, which differs but little, as regards external form, from an ordinary flat-top cooking-stove, but when the internal structure and arrangement are considered the similarity in a great measure ceases.

The upper portion of the stove consists, in the present instance, of two compartments, F and G, the former being separated from the latter by the partition H, and from the fire-place J by the plate I, in which are two circular boiler-openings for the reception of detachable covers $a$, the top plate, A, above the compartment F having also circular openings directly above those in the plate I. These latter openings, together with the manner of adapting culinary utensils to the same, will be especially alluded to hereinafter.

To brackets $i$, on the front plate D of the stove, is hung the door K, which is arranged either to close the front opening to the compartment F, as shown in Fig. 2, or to fall down to the position illustrated in Fig. 3, beyond which point it cannot be depressed, owing to projections $c$ $c$, which bear against the front plate of the stove. When the door is in the latter position, its upper surface is level with that of the plate I above the fire-chamber J. It should be understood that there are a series of openings or perforations, $a'$, in the door K, near the lower edge of the same, for the purpose described hereinafter. In the partition H is an opening, to which is adapted a perforated valve or damper, $d$, the latter being so hung to the partition-plate that it can be readily made to assume either of the two positions illustrated in Figs. 2 and 3.

L is the oven, which is separated from the compartment G by the plate M, from the fire-chamber J by the plate N, from the ash-pit Q by the plate P, from the rear flues, R, R', and S, (see Fig. 1,) by the plate T, and from the lower flues by the plate U.

The lower portion, $e$, of the partition-plate H is made hollow, and forms a chamber, to which the external air has free access through openings in the opposite side plates E' and E² of the stove, and between this lower end of this hollow portion $e$ of the partition-plate H and the top plate, M, of the oven is a passage, V, through which the products of combustion escape from the fire-place J into the compartment G, the products of combustion in escaping through this passage being met by jets or streams of air, which are discharged through an opening or openings, x, in the said chamber e of the partition H.

At the rear of the compartment G, and in the plate T, is an opening furnished with a valve or damper, W, which can be so operated by a spindle projecting through one of the side plates of the stove as to be readily made to close the opening, as seen in Fig. 2, or to expose the same, as seen in Fig. 3. When the valve is closed, the products of combustion will pass through openings $ff$ (see perspective view, Fig. 4) into the diving-flues R and R'; but when the valve is open and depressed, as seen in Fig. 3, the products of combustion, or at least the greater portion of the same, will pass directly into the flue S, and thence through the exit-opening X into the chimney. When the products of combustion pass down the diving-flues R and R', they take a course beneath the oven, as shown by the arrows, Fig. 2, and, returning through the flue V, pass upward through the flue S, and thence through the exit-opening to the chimney. The fire-chamber J is furnished with the usual grate, $h$, in front of which and to the front plate D of the stove are hung the two doors $i\,i$. The ash-pit Q projects to a suitable distance beyond the front of the stove, the upper edge of the ash-pit having the usual hearth, $k$, and detachable cover-plate $m$.

Having referred to the several parts composing the stove, I will proceed to explain those portions in which my improvements more especially consist. If we consider the stove as bisected by a horizontal plane represented by the line 5 6, Fig. 2, and the plate I as continued in that plane to the rear of the stove, so that there may be a flue between that plate and the top plate, M, of the oven, it will be seen that all below the plane will represent a complete flat-top cook-stove, that portion above the plane being a superstructure in which my improvements are mainly embodied. This superstructure or addition to an ordinary flat-top cook-stove is wider than the lower portion, as will be seen on reference to the diagram, Fig. 6.

A portion of these improvements consists in the culinary boilers, and the manner of adapting the same to the openings in the top plate A. On reference to Figs. 2 and 3, it will be seen that beneath this plate A and round the edge of each boiler-opening in the same is cast an annular projection, $n$, on the lower end of which is an annular lip, $n'$, and on this lip rests the annular flange $p'$ of the boiler $q$, the form of which will be best observed on reference to the detached view, Fig. 5. Round the edge of each boiler-opening in the top plate A is a recess, in which rests the cover-plate $t$, the latter being free from contact with and, in fact, some distance above the flange $t$ of the boiler. Each annular projection $n$, above alluded to, has any suitable number of openings communicating with the interior of the upper portion of the stove, these openings being situated between the cover-plate $p$ and the flange $t$ of the boiler, so that the steam and fumes generated in the latter in preparing articles of diet must pass off through these openings in the direction pointed out by the arrows, Fig. 3, into one or other of the compartments F and G, and thence to the chimney, all escape through the opening in the top plate of the stove being cut off by the cover-plates $t$. Instead of directing the fumes into the compartments F and G, special flues situated beneath the top plate A may be arranged for conveying the fumes to the chimney.

It will be seen on reference to the detached view, Fig. 5, that each boiler is provided with two lugs, $w\,w$, to which are connected the bails or handles $y$, these lugs passing through openings in the cover $t$. When two of the boilers are inserted into the front compartment, F, each is directly above one of the openings in the plate I. The bottom of the boiler, in the absence of the detachable covers $a$, is consequently exposed to the direct action of the fire in the chamber J, while the body of the boiler is exposed to the products of combustion which circulate within the said compartment F. The rear boilers inserted into the compartment G are also exposed to the action of the products of combustion, which circulate through the said compartment prior to passing off through the flues, the heat of these products of combustion having been necessarily increased by the jets or streams of air which pass through the openings $x$ of the chamber $e$.

It will be readily seen that by so forming the tops of the boilers the openings in the top plate A for the reception of the said boilers and the covers $t$ of the latter that the fumes from the boilers shall be directed to the compartments F and G, the disagreeable vapors which are invariably given out from ordinary stoves and ranges are effectually disposed of. At the same time the necessary depth of the compartments F and G for the proper reception of the boilers entire results in another advantage of no less importance than that of disposing of the fumes.

In ordinary stoves and ranges the boilers and other culinary vessels are placed directly above the openings in the top plate, so that the bottoms (and perhaps a portion of the sides) only of the vessels are exposed to the direct heat, the other portions being exposed to the free circulation of the comparatively cool external air. In my improvement, however, the whole body of the boiler is confined within a compartment in which the caloric circulates and is temporarily confined, so that a greater surface of the boiler is necessarily exposed to the heat, the quantity of fuel required being the same as, or even less, than that used in ordinary stoves and ranges.

It has been found by practical tests that the action of the heat on the boilers, depressed as they are into inclosed compartments, is much more rapid and at the same time more uniform than in ordinary stoves.

The use of the superstructure above alluded to as comprising the two compartments F and G is not limited to the effectual heating of the boilers and the disposal of the fumes from the same, as the front compartment, F, is admirably adapted to roasting, frying, broiling, and other culinary operations, the fumes from which are equally as annoying as those generated in the boilers. After withdrawing the boilers from the front compartment, F, covering the upper boiler-holes, letting down the door K to the position shown in Fig. 3, the said compartment is in a condition to be used, and is admirably adapted for broiling or frying, the fumes and vapors thereby generated passing off through the opening in the partition-plate H, and thence with the products of combustion to the chimney.

It will be seen that the opening to the compartment F exposed by the lowering of the door K affords easy access to the articles which are being fried or broiled in the said compartment, while the door itself presents a convenient shelf for the reception of plates, dishes, &c., which should be at hand in cooking articles of diet by frying and broiling.

When the compartment F has to be used as a roasting-oven, the boilers are withdrawn, the openings in the top plate as well as those in the plate I above the fire-place are covered, and the door K is elevated, so that the articles to be roasted may be inclosed, or to a certain extent inclosed, for it should be understood that a current of pure air passes through the perforations $a'$ of the door K into the compartment, this current being rendered continuous by the perforations in the valve $d$, for it is essential that pure air should have access to articles submitted to the process of roasting.

In ordinary cooking-stoves there is above the oven a shallow flue, through which the products of combustion pass rapidly, thereby heating the top of the oven prior to passing beneath the same.

I have found by practical tests that by forming above the oven an enlarged compartment or compartments, which must necessarily contain an increased quantity of caloric, the oven can be heated more rapidly and can be maintained at a more uniform temperature at a smaller expense for fuel than in stoves of the ordinary construction. The two compartments F and G may, therefore, be considered as reservoirs, in which the products of combustion circulate and are to a certain extent retained, so as to furnish the desired amount of uniform heat to the oven.

A still further advantage attained by the adoption of my improvement is the additional heat derived from the exterior of the structure above the oven and fire-place—an object of especial importance when the stove is used for both cooking and heating purposes.

Although I have illustrated and described the space between the top plate A and the top of the fire-place and oven as divided into two compartments, and although I prefer this arrangement, it will be evident that the said space may be devoted to one compartment only, without any sacrifice of the advantages described above as being derived from the manner of disposing of the fumes generated in cooking.

In the diagram, Fig. 6, it will be seen that the upper portion of the stove is enlarged laterally. This affords me the desired room for the insertion of boilers of proper dimensions.

I claim as my invention and desire to secure by Letters Patent—

1. The chamber F, with its door K, the chamber G, the fire-place J, and the oven L, when the said chambers are arranged to receive the culinary vessels, to communicate with each other and the fire-place, and in respect to each other and the oven, substantially as and for the purpose herein set forth.

2. The culinary vessel $q$ and the flange $p$ on the upper edge of the same, said flange resting on a ledge, $n'$, so formed in the top plate, A, of the stove and so situated in respect to perforations $v$ that the said perforations shall form a communication between the interior of the vessel and the chamber within which the vessel is suspended, for the purpose described.

3. The combination of the compartment F, the perforated door K, and the perforated valve $d$, or its equivalent, the whole being arranged for roasting, frying, broiling, and other like purposes, substantially as described.

In testimony whereof I have signed my name to this specification in the presence of two subscribing witnesses.

DAVID STUART.

Witnesses:
 A. H. PERKINPINE,
 W. A. STEEL.